United States Patent [19]
Hara et al.

[11] Patent Number: 5,414,586
[45] Date of Patent: May 9, 1995

[54] SUPERCONDUCTING CURRENT LIMITING DEVICE

[75] Inventors: Tsukushi Hara, Saitama; Takeshi Ohkuma, Tokyo; Kazuyuki Tsurunaga, Tokyo; Daisuke Ito, Tokyo; Takamitsu Tada, Chiba, all of Japan

[73] Assignee: Kabushiki Kaisha Toshiba, Kawasaki, Japan

[21] Appl. No.: 49,446

[22] Filed: Apr. 20, 1993

[30] Foreign Application Priority Data

Apr. 20, 1992 [JP] Japan .................... 4-099438

[51] Int. Cl.⁶ .............................................. H02H 3/08
[52] U.S. Cl. ................................. 361/19; 361/57; 361/93
[58] Field of Search ................ 361/19, 56, 58, 141, 361/93, 57

[56] References Cited

U.S. PATENT DOCUMENTS 5,021,914 6/1991 Tsurunaga et al. ............ 361/19

Primary Examiner—Marc S. Hoff
Assistant Examiner—S. Jackson
Attorney, Agent, or Firm—Oblon, Spivak, McClelland, Maier & Neustadt

[57] ABSTRACT

A superconducting current limiting device for limiting overcurrent flowing in a load. The device includes a current limiter with a first superconducting coil, a second superconducting coil arranged coaxially with the first superconducting coil so as to have a negative magnetic coupling condition, and a third superconducting coil arranged coaxially with the first and second superconducting coils so as to have a negative magnetic coupling condition with the second superconducting coil and so as to have a positive magnetic coupling condition with the first superconducting coil. The first and second superconducting coils are electrically connected in series. The device includes a high speed switch connected electrically in series with the third superconducting coil to form a series circuit. The series circuit is electrically connected in parallel with the second superconducting coil.

The device further includes a current monitoring circuit for monitoring current flowing in the load and for generating a signal so as to close the high speed switch when the current flowing in the load exceeds a prescribed value.

6 Claims, 5 Drawing Sheets

SUPERCONDUCTING CURRENT LIMITING DEVICE

BACKGROUND OF THE INVENTION

1. Field of the Invention

This invention relates to a superconducting current limiting device that limits overcurrent flowing in an AC path, using a superconducting coil. In more detail, this invention relates to a superconducting current limiting device capable of limiting overcurrent without generating a quench phenomenon whereby the superconducting coil performs an abrupt phase transition from superconducting condition to ordinary conducting condition.

2. Description of the Related Art

If a three-phase short-circuit or "earth drop" occurs in an AC current path such as a distribution line, a fault current i.e., an overcurrent of several tens of kA may result, causing tremendous damage to the distribution system and equipment. Superconducting current limiting devices have been devised which make use of superconductivity as one current limiting technique for instantaneously detecting and controlling such fault currents.

Figure 8:
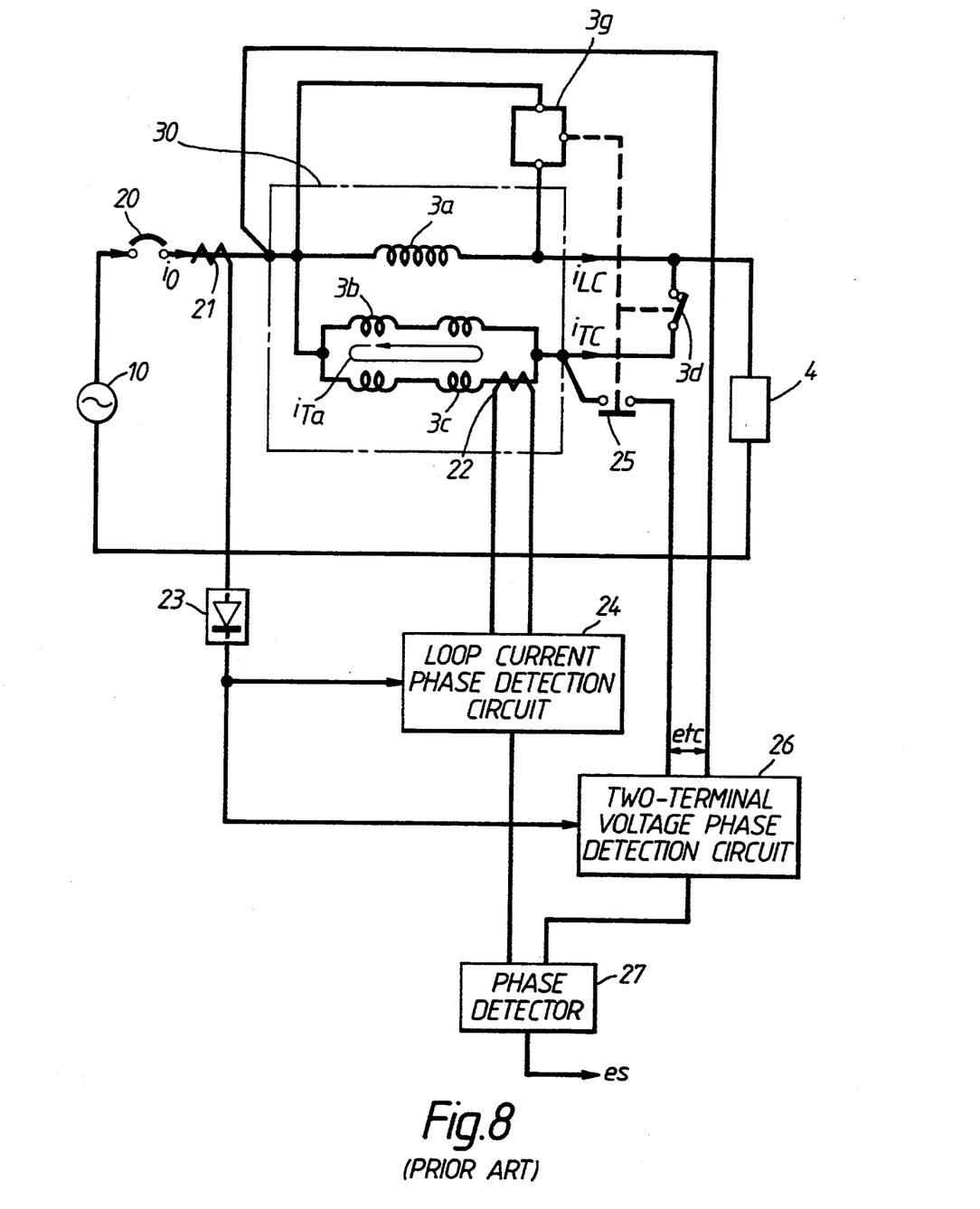
FIG. 8 is a view showing the circuit layout of a conventional superconducting current limiting device.

FIG. 8 is a circuit diagram showing the layout of a prior art superconducting current limiting device as described above disclosed in early Japanese patent disclosure number H 2-168 525. In this FIG. 10 is a current source, 20 is an interrupter, 30 is a current limiter, 3a is a superconducting current limiting coil (hereinbelow called a current limiting coil), 3b and 3c are trigger coils, 3d is a switch, 3g is a quench sensor, 4 is a load, 21 is a current transformer for detecting the total circuit current, 22 is a current transformer for detecting the loop current of the trigger coils, 23 is a control power source, 24 is a loop current phase detection circuit, 25 is a switch for connecting or isolating two-terminal voltage phase detection circuit 26 of the trigger coils to or from the main circuit, and 27 is a phase detector for comparing and detecting the phase difference of current and voltage of the trigger coils.

A simple explanation of the operation of this current limiting device will now be given. In the steady-state condition, the circuit current flows through non-inductive superconducting (zero resistance) trigger coils 3b and 3c, so that power continues to be supplied normally to load 4. Then, if load 4 is short-circuited etc., an excessive fault current flows in the circuit. When the value of this fault current reaches the critical current value of the superconducting wire constituting the trigger coils, the trigger coils are quenched i.e. execute a transition to high resistance. As a result, the fault current is suppressed, and is commutated to a current limiting coil of lower impedance from the trigger coils. The trigger coils are thereby converted into ordinary conductors and so generate heat which dissipates the coolant and also raises the temperature of the superconducting wire. Switch 3d opens immediately after commutation of the fault current from the trigger coil current to the current limiting coil, so as to suppress evaporation of coolant. It also assists in restoring superconduction of the trigger coils so that they are ready to respond to the next fault occurrence, by speeding up the rate of cooling of the trigger coils. Restoration of superconduction of the trigger coils is detected by respective phase detectors 24 and 26 and their comparator 27. When both conditions, i.e. the system fault has been recovered and the trigger coils have returned to superconduction, have been satisfied, switch 3d closes and the equipment thereby returns to the stand-by condition.

The prior art superconducting current limiting device described above is subject to the following problems.

(1) Since the prior art superconducting current limiting device described above is of the type in which the superconductor is quenched, there are the problems that there is a considerable Joule loss Pj on current limiting operation (quenching), and the amount of consumption (vaporization) of coolant used to cool the superconductor is increased.

If the quenching resistance Rq of the trigger coils is fixed, the value of this Joule loss Pj is proportional to the square of the source voltage V, as shown by the following equation.

$$Pj = (V^2/Rq)t \; (J) \qquad (1)$$

where t is the conduction time (seconds) after occurrence of quenching.

Consequently, if the circuit voltage is increased, this results in an increase in the loss generated on quenching and an increase in the consumption (evaporation) of coolant used to cool the superconductor. As an example, assuming that a short-circuit current generated in a circuit of 6.6 kV is current-limited in one cycle (20 msec) by a trigger coil of quench resistance 30 Ω, the loss which then occurs can be found as follows from equation (1).

$$\begin{aligned} Pj &= (V^2/Rq) \cdot t \\ &= (6600^2/30) \times 0.02 \\ &= 29040 \; (J) \end{aligned}$$

If we assume that the coolant is liquid helium, about 12 liters of liquid is instantaneously evaporated. This evaporated helium expands to a volume of several hundred times, so the cryostat in which the superconducting current limiting device is received must be of large size and rigid structure so as to be capable of withstanding the internal pressure which is then generated. A further problem is that means must be provided so that the evaporated helium can be discharged to outside.

(2) Once current-limiting operation has been performed, some considerable time is required to restore the equipment to its original superconducting condition. The equipment therefore cannot be used with high frequency.

Usually, when such a superconducting coil is quenched, the superconductor rises in temperature by some tens to some hundreds of K. Consequently some tens of seconds to some minutes are subsequently required to cool the conductor of the superconducting coil down to the critical temperature for superconduction i.e. about 10K. During this period, the equipment cannot function as a current-limiting device. One method of dealing with this problem that has been considered is to reduce the recovery time by installing two trigger coils which are used alternately. However, this is inefficient as it increases the size of the equipment and complicates its control.

(3) A further problem is that, in a quenching-type superconducting current limiting device, the current limiting condition is determined solely by the quenching current of the trigger coil, so the condition for its current limiting action cannot be selected over a wide range.

Specifically, when a current limiting device is applied to various systems, the system protection conditions must be chosen optimally taking into account the relationship between the level (i) of overcurrent and the time (t) for which it passes. However, in the conventional quenching type current limiting device, current-limiting or non-current limiting mode is determined solely by the value of the overcurrent level (i). Thus, the conventional equipment is lacking in flexibility in its application to different systems.

(4) Yet a further problem is that, since the current limiting operation current is determined by the critical current value of the trigger coil, it can only have the value that was designed beforehand. Coil standardization is therefore difficult.

Specifically, in linking systems of different types, it is necessary to have the operation current value of the individual current limiting devices slightly different from each other (selectable limiting current/selectable cut-off). However, with the prior art superconducting current limiting devices, different operating current can only be achieved by altering the critical current value of the superconducting wire constituting the coil. A large number of different coil types are therefore required.

SUMMARY OF THE INVENTION

Accordingly, one object of this invention is to provide a superconducting current limiting device wherein instantaneous current limitation with the equipment still in the superconducting condition i.e. without quenching the superconducting coil, as well as instantaneous steady-state recovery, can be achieved. Another object of this invention is to provide a superconducting current limiting device, wherein the current limiting operation current can be freely set.

These and other object of this invention can be achieved by providing a superconducting current limiting device for limiting overcurrent flowing in a load. The device includes a current limiter with a first superconducting coil, a second superconducting coil arranged coaxially with the first superconducting coil so as to have a negative magnetic coupling condition, and a third superconducting coil arranged coaxially with the first and second superconducting coils so as to have a negative magnetic coupling condition with the second superconducting coil and so as to have a positive magnetic coupling condition with the first superconducting coil. The first and second superconducting coils are electrically connected in series. The device includes a high speed switch connected electrically in series with the third superconducting coil to form a series circuit. The series circuit is electrically connected in parallel with the second superconducting coil. The device further includes a current monitoring circuit for monitoring current flowing in the load and for generating a signal so as to close the high speed switch when the current flowing in the load exceeds a prescribed value.

With the current limiting device of this invention, in the ordinary condition, in which the high speed switch is open, the first and second superconducting coils, which are series-connected and which have a negative magnetic coupling condition, are in a non-inductive condition so that their impedance is low; however, when an overcurrent greater than a prescribed value flows in the load, closing the high speed switch, the second superconducting coil and third superconducting coil go into the non-inductive condition, while high impedance is produced by the impedance of the first superconducting coil; as a result, overcurrent of the load can be suppressed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, the embodiment of this invention will be described below.

Figure 1:
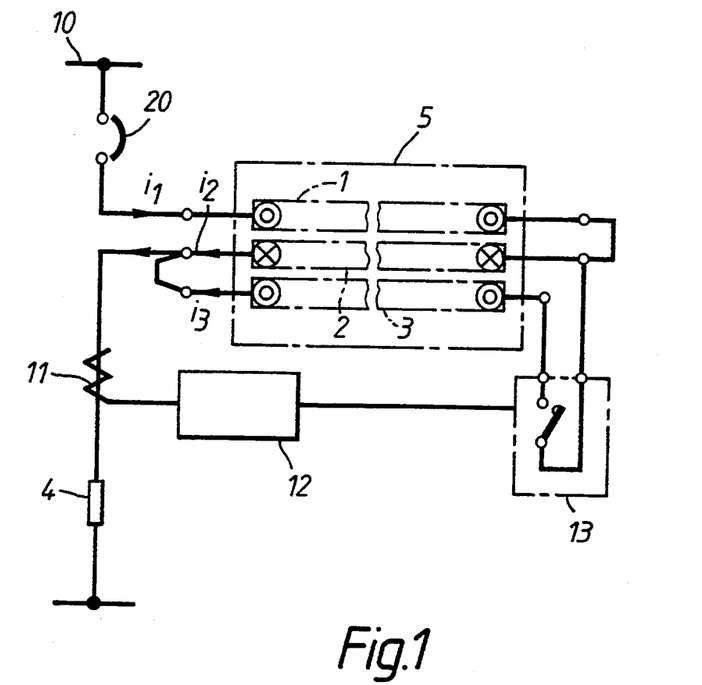
FIG. 1 is a diagram showing the layout of a superconducting current limiting device according to a preferred embodiment of this invention.

FIG. 1 is a view showing the layout of a superconducting current limiting device according to an embodiment of this invention. The superconducting current limiting device shown in this Figure is connected through circuit breaker 20 between power source 10 and load 4. This superconducting current limiting device is provided with a current limiter 5, a current sensor 11, a switch operating circuit 12, and a high speed switch 13. Current limiter 5 consists of a first superconducting coil 1, a second superconducting coil 2, and a third superconducting coil 3. First superconducting coil 1 has one of its ends connected to power source 10 through circuit breaker 20. Second superconducting coil 2 has a prescribed mutual inductance with respect to superconducting coil 1 and is arranged coaxially so as to provide a negative magnetic coupling condition in order to produce practically zero induction, and is electrically connected in series therewith. Third superconducting coil 3 is connected in parallel with second superconducting coil 2 through high speed switch 13 and is arranged coaxially with said first and second superconducting coils so as to provide a positive magnetic coupling condition with said first superconducting coil 1 and so as to provide a negative magnetic coupling condition with said second superconducting coil 2. Current sensor 11 monitors the current flowing through load 4 and, in the case overcurrent wherein this current exceeds a prescribed value, outputs an overcurrent detection signal. Switch operating circuit 12 is driven by the overcurrent detection signal from current sensor 11 and drives high speed switch 13 so as to close it. High speed switch 13 is connected in series with third superconducting coil 3 and connects third superconducting coil 3 in parallel with second superconducting coil 2.

In the steady-state condition, high speed switch 13 is open and third superconducting coil 3 is not connected to first superconducting coil 1 and second superconducting coil 2. In this steady-state condition, current limiter 5 has the low impedance condition of a non-inductive circuit, and steady current flows from power source 10 to load 4. If overcurrent is generated in load 4, current sensor 11 detects this overcurrent. As a result, switch operating circuit 12 drives high speed switch 13, causing it to close, thereby connecting third superconducting coil 3 in parallel with second superconducting coil 2. As a result, low impedance i.e. a non-inductive circuit is constituted by the second superconducting coil 2 and third superconducting coil 3, while high impedance i.e. an inductive condition is formed due to the imductance of the first superconducting coil 1. This suppresses the overcurrent.

Specifically, due to the first superconducting coil 1, second superconducting coil 2 and third superconducting coil 3 used in the superconducting current limiting device shown in FIG. 1 being arranged coaxially, adjacent at their diameters, the magnetic coupling condition between these superconducting coils can be changed by opening and closing high speed switch 13. As a result, specifically, low impedance can be produced by using high speed switch 13 to isolate third superconducting coil 3 and to produce a non-inductive condition of first and second superconducting coils 1 and 2 by connecting only these in negative magnetic coupling condition. Alternatively, high impedance can be formed by the inductance of the first superconducting coil 1 with low impedance being formed by a negative magnetic coupling condition of second superconducting coil 2 and third superconducting coil 3 by using high speed switch 13 to effect connection between third superconducting coil 3 and second superconducting coil 2. Thus, it is possible to select at high speed a low impedance condition (non-inductive condition) or a high impedance condition (inductive condition).

Figure 2A:
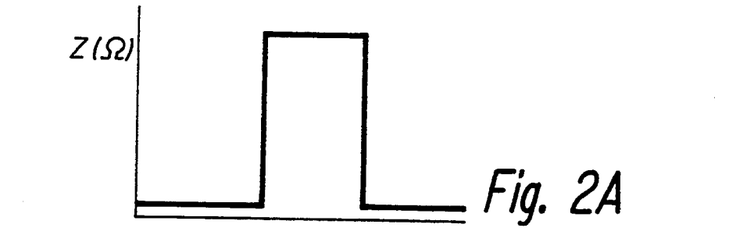
FIG. 2 is a waveform diagram showing the relationship between operation of the high speed switch of the superconducting current limiting device shown in FIG. 1 and impedance of the superconducting current limiting device.
Figure 2B:
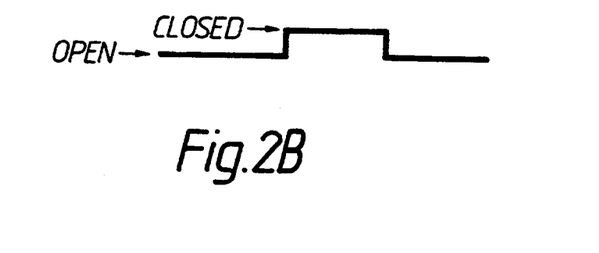

FIG. 2 is a view showing the change in impedance of the superconducting current limiting device shown in FIG. 1 related to the operating condition of high speed switch 13. When high speed switch 13 is open, the superconducting current limiting device is in the low impedance condition. When high speed switch 13 is closed, the superconducting current limiting device is in high impedance condition.

Figure 3:
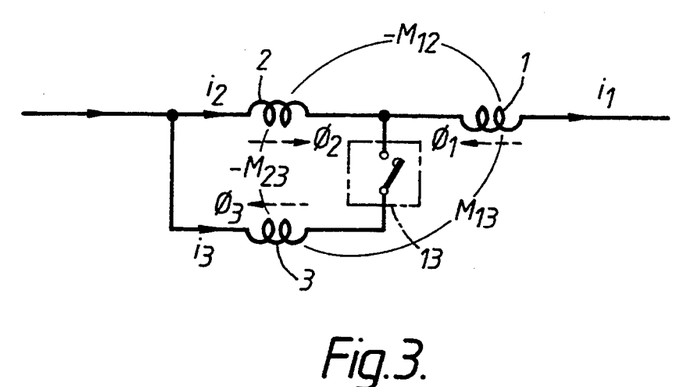
FIG. 3 is a diagram showing the first to third superconducting coils constituting the current limiter of the superconducting current limiting device shown in FIG. 1.

FIG. 3 is a diagram showing the electrical connection condition and the magnetic coupling condition of first to third superconducting coils 1 to 3 shown in FIG. 1, the directions of currents i1, i2, i3 flowing in respective superconducting coils 1 to 3, and the directions of magnetic fluxs $\phi 1$, $\phi 2$ and $\phi 3$.

As can be seen from FIG. 3, first superconducting coil 1 and second superconducting coil 2 are negatively coupled with a coefficient M12. Second superconducting coil 2 and third superconducting coil 3 are negatively coupled with a coefficient M23. First superconducting coil 1 and third superconducting coil 3 are positively coupled with coefficient M13.

The variables $\phi 1$, $\phi 2$ and $\phi 3$ indicate the magnetic flux generated when current flows in respective superconducting coils 1 to 3. The direction of the arrow of the dotted lines indicates the direction of the magnetic flux at the center of the superconducting coil.

Figure 4A:
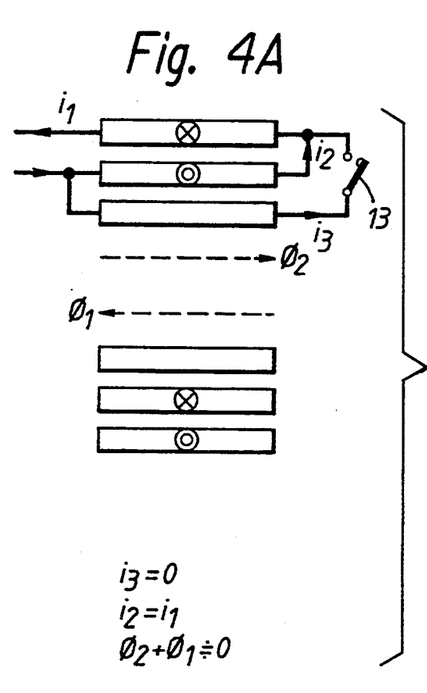
FIG. 4 is a diagram showing the magnetomotive force direction and connection conditions of the first to third superconducting coils constituting the current limiter shown in FIG. 3.
Figure 4B:
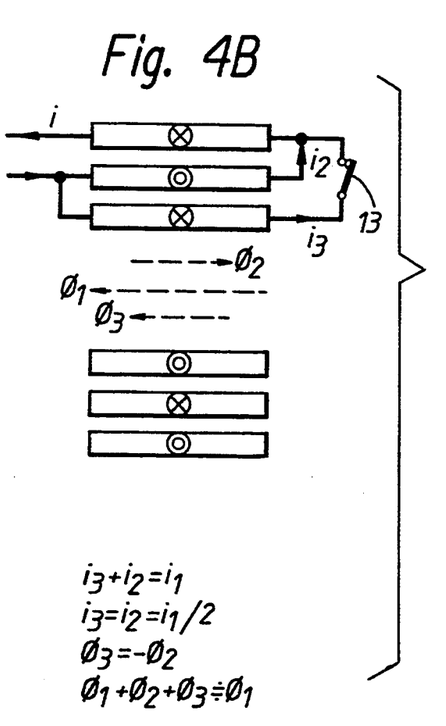

FIG. 4 shows qualitatively the direction of the currents i1, i2 and i3 flowing in respective superconducting coils 1 to 3, and the direction and the quantity of magnetic fluxs $\phi 1$, $\phi 2$ and $\phi 3$ generated as a result, when high speed switch 13 is opened and closed.

When high speed switch 13 is in the open condition, circuit current flows in series through only first superconducting coil 1 and second superconducting coil 2; it does not flow in third superconducting coil 3. Since, as described above, first superconducting coil 1 and second superconducting coil 2 are magnetically negatively coupled, the directions of their magnetic fluxes are mutually opposite directions ($\phi 1$, $\phi 2$) as shown, so that they cancel each other out to produce only a very small value. The series inductance $L_{OS}$ of the first superconducting coil 1 and second superconducting coil 2 can then be determined from the following equation.

$$L_{OS} = L1 + L2 - 2 \times M12 \, (L1 \times L2)^{\frac{1}{2}} \qquad (H)$$

where L1 is the self inductance of first superconducting coil 1, L2 is the self inductance of second superconducting coil 2, and M12 is the magnetic coupling coefficient between the first superconducting coil 1 and second superconducting coil 2.

In general, the magnetic coupling coefficient M of coils of this kind depends on the mutual difference of the coil diameters. In the case of coils of the same diameter, M is 1.0. However, since the coaxial coils cannot physically be of the same diameter, in the actual coils, the value of M is smaller than 1.0.

When high speed switch 13 is closed, the third superconducting coil 3 is connected in parallel with the second superconducting coil 2, so the circuit current that was flowing through first superconducting coil 1 and second superconducting coil 2 in series is branched to third superconducting coil 3, the ratio of the current division effected by this branching being determined by the distribution of the respective coupling coefficients. To give a qualitative explanation of this phenomenon, since second superconducting coil 2 and third superconducting coil 3 generate magnetomotive forces in mutually opposed directions, the magnetic fluxes which they generate, namely, $\phi 2$ and $\phi 3$, as shown in FIG. 4, cancel each other out. As a result, second superconducting coil 2 and third superconducting coil 3 constitute a parallel non-inductive circuit, producing a very low impedance condition.

First superconducting coil 1 is positively coupled to third superconducting coil 3 and negatively coupled to second superconducting coil 2. That is, the resultant inductance of first superconducting coil 1 and the other superconducting coils acts in the increasing direction with respect to third superconducting coil 3 but in the reducing direction with respect to second superconducting coil 2. However, the magnetic flux $\phi 1$ created by the first superconducting coil 1 which passes through the interior of the coils acts in the cancelling direction, so the current division ratio of the currents i2 and i3 flowing through the second superconducting coil 2 and third superconducting coil 3 is such that i2>i3, resulting in the inductance of first superconducting coil 1 being lowered.

The current limiter inductance $L_{OT}$ can then be found from the following equation (2).

$$L_{OT} = Lp + Ls \ (H) \qquad (2)$$

where Lp is the parallel resultant inductance of second superconducting coil 2 and third superconducting coil 3, and is as follows:

$$Lp = -(Lp2 \times Lp3)/(Lp2 + Lp3)$$

$$Lp2 = L2 - \times M23 \ (L2 \times L3)^{\frac{1}{2}} - 2 \times M12 \ (Li \times L2)^{\frac{1}{2}}$$

$$Lp3 = L3 - 2 \times M23 \ (L2 \times L3)^{\frac{1}{2}} + 2 \times M13 \ (Li \times L3)^{\frac{1}{2}}$$

Where Lp3 is the resultant inductance between third superconducting coil 3 and first superconducting coil 1 and second superconducting coil 2, Lp2 is the resultant inductance between second superconducting coil 2 and first superconducting coil 1 and third superconducting coil 3, M12 is the magnetic coupling coefficient between first superconducting coil 1 and second superconducting coil 2, M23 is the magnetic coupling coefficient between second superconducting coil 2 and third superconducting coil 3, and M13 is the magnetic coupling coefficient between second superconducting coil 2 and first superconducting coil 1.

Ls is the resultant inductance between first superconducting coil 1 and second superconducting coil 2 and third superconducting coil 3, and is as follows:

$$Ls = L1 + 2 \times M31 \ (L1 \times L3)^{\frac{1}{2}} - 2 \times M12 \ (L1 \times L2)^{\frac{1}{2}}$$

The resultant inductance $L_{OT}$ of the series/parallel circuit of superconducting coils 1 to 3 is determined by the values of the coupling coefficients M, but, as a typical value, is about 50% of the self inductance L1 of first superconducting coil 1.

As described above, this superconducting current limiting device is so constructed that the low impedance condition or high impedance condition can be selected at will by opening or closing high speed switch 13.

Figure 5:
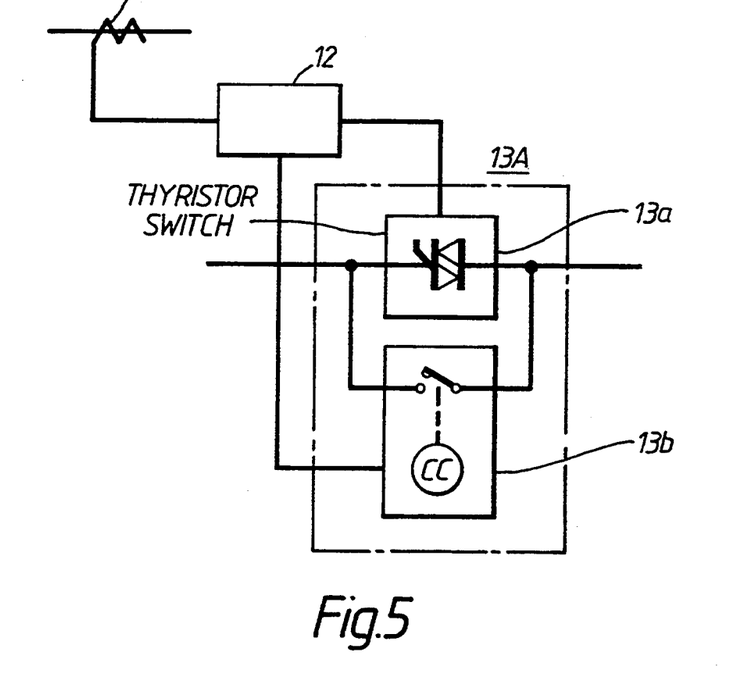
FIG. 5 is a diagram showing the circuitry of the main parts of a superconducting current limiting device according to another embodiment of this invention.

However, since the short-circuit current flowing in a superconducting current limiting device of this type has an extremely large value of current change rate di/dt, there is a problem regarding the response speed of high speed switch 13. If the response speed of this high speed switch 13 is too slow, it allows the first wave of the short-circuit current to pass. Not only does this vitiate the intended current limiting effect, but also, if the peak value of this short-circuit current exceeds the critical current value of the superconducting coil, it will of course cause quenching of the superconducting coil, with serious damage to the superconducting current limiting device. FIG. 5 shows a specific construction of a high speed switch designed taking into account such conditions.

FIG. 5 is a partial circuit diagram of a superconducting current limiting device according to another embodiment of this invention. The current limiting device shown in this Figure differs only in that the high speed switch 13A is constituted by a thyristor switch 13a and mechanical switch 13b connected in parallel in place of high speed switch 13 in the embodiment of FIG. 1. The rest of the construction is the same as the embodiment of FIG. 1, and is therefore omitted.

Just as in the embodiment of FIG. 1, thyristor switch 13a and mechanical switch 13b are driven by an overcurrent detection signal from current sensor 11 which is supplied through switch operating circuit 12. Thereupon, thyristor switch 13a is initially turned on. This produces a current limiting condition of the superconducting current limiting device, which suppresses the overcurrent. At this time, the overcurrent which is being suppressed flows through thyristor switch 13a. Subsequently, however, within a few cycles, mechanical switch 13b is closed. When mechanical switch 13b is closed, practically all of the current flowing in thyristor switch 13a is commutated to low-resistance mechanical switch 13b, so that at this time, the possibility of damage to thyristor switch 13a is eliminated. Thyristor switch 13a need therefore only have a rating such as to provide very short-time capacity of about one cycle. This thyristor can therefore be of compact shape.

Next, the operation of the embodiment of FIG. 5 will be described with reference to the waveform shown in FIG. 6.

Figure 6:
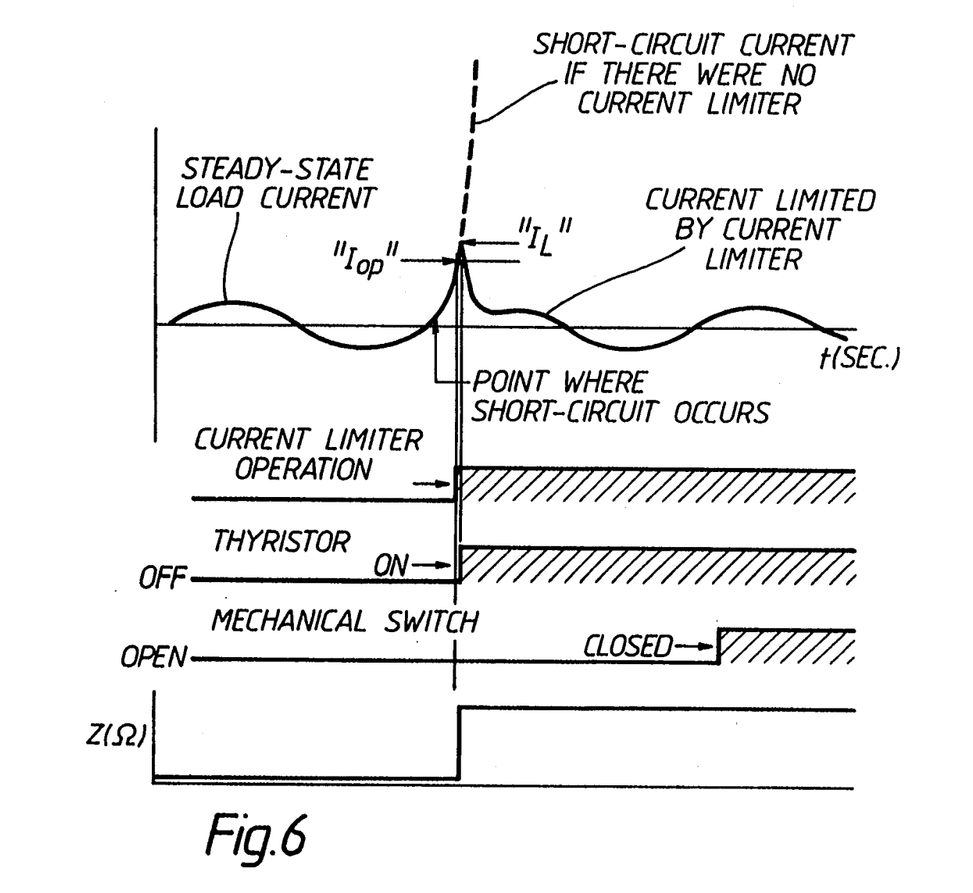
FIG. 6 is a waveform diagram showing the action of the superconducting current limiting device shown in FIG. 5.

In the steady-state condition, when thyristor switch 13a and mechanical switch 13b constituting high speed switch 13A are in the off condition, the steady-state load current i.e. the circuit current, as shown in the left half of FIG. 6a, flows through the series circuit consisting of first superconducting coil 1 and second superconducting coil 2. In this case, since first superconducting coil 1 and second superconducting coil 2 constitute a series non-inductive circuit, its impedance is extremely small and the superconducting condition is maintained, so the circuit current flows to load 4 from power source 10 through first superconducting coil 1 and second superconducting coil 2 without giving rise to any power loss.

Next, if a fault such as a short-circuit occurs in load 4, short-circuit current flows in the circuit. When its current value exceeds current limiting operation current $I_{OP}$ as shown in FIG. 6a, current sensor 11 detects this current and supplies an overcurrent detection signal to switch operating circuit 12, with the result that, as shown in (b) of FIG. 6, thyristor switch 13a and mechanical switch 13b constituting high speed switch 13A are driven by switch operating circuit 12. As a result, thyristor switch 13a shifts to the on condition as shown in (c) of FIG. 6 in response to this signal with a delay of a few microseconds. This puts the superconducting current limiting device into the high impedance condition as shown in (e) of FIG. 6, restricting the short-circuit current to the prescribed value. It should be noted that the degree to which the current limiting peak value $I_L$ shown in (a) of FIG. 6 can be restricted is determined by the speed of operation of thyristor switch 13a constituting high speed switch 13A and the value of current change rate di/dt of the short-circuit current.

As described above, if the current limiting condition has to be continued after the suppression of the short-circuit current by turning thyristor switch 13a on, mechanical switch 13b is closed after a prescribed time as shown in (d) of FIG. 6. To return to the original steady-state condition, it suffices to return high speed switch 13A to the off condition.

Figure 7:
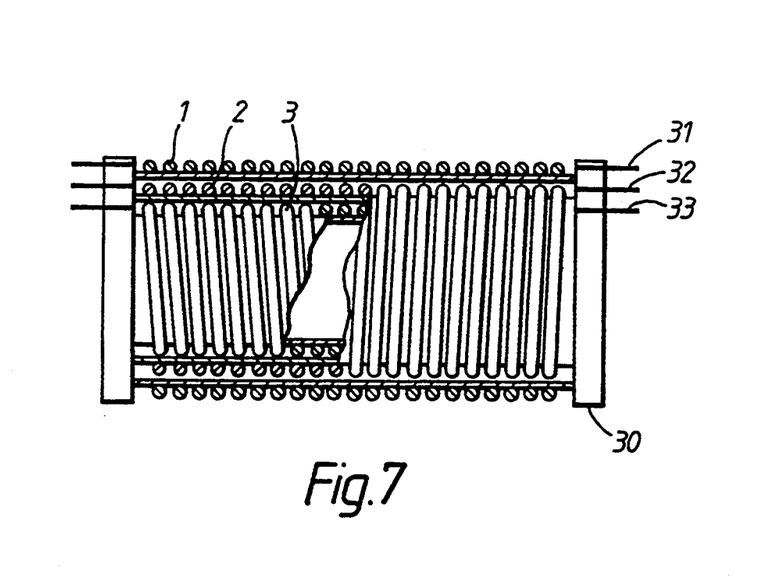
FIG. 7 is a view showing a specific example of the construction of a current limiter consisting of first to third superconducting coils used in the superconducting current limiting device shown in FIG. 1.

FIG. 7 is a view showing the layout of first to third superconducting coils 1 to 3 constituting current limiter 5 shown in FIG. 1. In this Figure, 30 is the coil winding frame and 1, 2 and 3 are respectively the first to third superconducting coils 1 to 3. First superconducting coil 1 is wound leftwardly as the outermost layer. Second superconducting coil 2 is wound leftwardly as an intermediate layer. Third superconducting coil 3 is wound rightwardly as the innermost layer. Element 31 is the terminal of first superconducting coil 1, 32 is the terminal of second superconducting coil 2, and 33 is the terminal of third superconducting coil 3.

Since the first to third superconducting coils 1 to 3 shown in FIG. 7 are arranged coaxially adjacent each other, the self inductance of respective superconducting coils 1 to 3 and the magnetic coupling coefficients M between the superconducting coils are as follows:

L1: Self inductance of first superconducting coil 1 = 10.0 mH
L2: Self inductance of second superconducting coil 2 = 9.4 mH
L3: Self inductance of third superconducting coil 3 = 9.0 mH
M12: Magnetic coupling coefficient between superconducting coils 1 and 2 = 0.98
M23: Magnetic coupling coefficient between superconducting coils 2 and 3 = 0.99
M31: Magnetic coupling coefficient between superconducting coils 3 and 1 = 0.97

From equation (1) described above, the steady-state impedance of this superconducting current limiting device is therefore as follows:

$$\begin{aligned} L_{OS} &= L1 + L2 - 2 \times M12 \, (L1 \times L2)^{1/2} \\ &= 10.0 + 9.4 - 2 \times 0.99 \, (10.0 \times 9.4)^{1/2} \\ &= 0.397 \, (\text{mH}) \end{aligned}$$

Also, the inductance $L_{OT}$ of the superconducting current limiting device when current limiting is being performed, from equation (2), is as follows:

$$\begin{aligned} L_{OT} &= Lp + Ls \\ &= -4.58 + 9.7 \\ &= 5.12 \, (\text{mH}) \end{aligned}$$

where $$\begin{aligned} Lp &= L3 - 2 \times M23 \times (L3 \times L2)^{1/2} + 2 \times M13 \times (L1 \times L3)^{1/2} \\ &= 9 - 2 \times 0.99 \times (9 \times 9.4)^{1/2} + 2 \times 0.97 \times (10 \times 9)^{1/2} \\ &= 9.09 \, (\text{mH}) \\ Lp2 &= L2 - 2 \times M23 \times (L3 \times L2)^{1/2} - 2 \times M12 \times (L2 \times L1)^{1/2} \\ &= 9.4 - 2 \times 0.99 \times (9 \times 9.4)^{1/2} - 2 \times 0.98 \times (9.4 \times 10)^{1/2} \\ &= -9.214 \, (\text{mH}) \end{aligned}$$

$$\begin{aligned} Lp &= -(LP1 \times LP2)/(Lp1 + Lp2) \\ &= -(9.09 \times 9.214)/(9.09 + 9.214) \\ &= -4.58 \, (\text{mH}) \end{aligned}$$

$$\begin{aligned} Ls &= L1 + 2 \times M31 \times (L1 \times L3)^{1/2} - 2 \times M12 \times (L2 \times L1)^{1/2} \\ &= 10 + 2 \times 0.97 \times (10 \times 9)^{1/2} - 2 \times 0.98 \times (9.4 \times 10)^{1/2} \\ &= 9.7 \, (\text{mH}) \end{aligned}$$

In the embodiment described above, in steady-state operation, high speed switch 13 is open so that the superconducting current limiting device is maintained at low impedance of 0.397 mH (0.12 Ω at 50 Hz). When an overcurrent condition is generated, causing high speed switch 13 to be closed, the impedance of the superconducting current limiting device is instantaneously increased from 0.397 mH to 5.12 mH (1.6 Ω at 50 Hz). Current limitation can thereby be achieved.

In the embodiment described above, the current limiting/non-limiting condition can be selected under conditions that may be chosen at will without quenching the superconducting coils constituting the superconducting current limiting device, and a prescribed current limiting inductance can thus be obtained. In this manner, the thermal load on the low temperature devices such as freezer and cryostat can be diminished, as the superconducting current limiting device is without loss, not only during steady-state operation, but also during current limiting operation. These devices can therefore be made of small size. Furthermore, a frequent and continuous current limiting operation can be performed, since no time is needed for recovery of superconduction after quenching. Furthermore, the equipment can be applied even to ordinary protective systems, since the conditions for switching to the current limiting operation can be set at will.

Although in the above embodiment a thyristor switch 13a was employed in high speed switch 13A, many further advantages can be obtained by employing a gate turn-off (GTO) thyristor instead. For example, if the high speed switch is constituted by a GTO switch, the impedance of the superconducting current limiting device itself can be varied if the on/off ratio of the GTO switch is varied under prescribed frequency. Specifically, if the GTO switch is maintained in the off condition, the impedance of the superconducting current limiting device remains at 0.397 mH in steady-state operation as described above. However, if it is continued to be held in off condition, the impedance rises to 5.12 mH. Therefore, by setting the on/off ratio of the GTO switch to an intermediate condition, the impedance of the superconducting current limiting device itself can also be set to an intermediate value.

Furthermore, although in the embodiment described above only one set of superconducting coils was employed depending on the conditions of use, an arrangement could be employed in which more than one set of superconducting coils are connected in series or in parallel.

As described above, with this invention, in the ordinary condition in which the high speed switch is open, the first and second superconducting coils which are connected in series and which have a negative magnetic coupling condition are in a non-inductive condition, so that their impedance is low. However, if an overcurrent of more than a prescribed value flows in the load, causing the high speed switch to be closed, the second and third superconducting coils go into the non-inductive condition, while the impedance of the first superconducting coil provided high impedance, thereby restricting the overcurrent of the load. The impedance can therefore be varied over a wide range without quenching the superconducting coils. This enables a superconducting current limiting device that can withstand current limiting operation at high frequency with low loss to be implemented in a compact manner.

Obviously, numerous modifications and variations of the present invention are possible in light of the above teachings. It is therefore to be understood that within the scope of the appended claims, the invention may be practiced otherwise than as specifically described herein.

What is claimed is:

1. A superconducting current limiting device for limiting overcurrent flowing in a load, said device comprising:
- a current limiter including a first superconducting coil, a second superconducting coil arranged coaxially with said first superconducting coil so as to have a negative magnetic coupling condition, and a third superconducting coil arranged coaxially with said first and second superconducting coils so as to have a negative magnetic coupling condition with said second superconducting coil and so as to have a positive magnetic coupling condition with said first superconducting coil;
- said first and second superconducting coils being electrically connected in series;
- high speed switch means connected electrically in series with said third superconducting coil to form a series circuit; said series circuit being electrically connected in parallel with said second superconducting coil; and
- current monitoring means for monitoring current flowing in said load and for generating a signal so as to close said high speed switch means when said current flowing in said load exceeds a prescribed value,
- wherein said first, second and third superconducting coils having a critical current value Larger than said prescribed value.

2. The device according to claim 1, wherein: said high speed switch means includes, semiconductor switch means, and
- mechanical switch means connected in parallel with said semiconductor switch means; and
- when said high speed switch means receives said signal from said current monitoring means said semiconductor switch means is firstly closed and then said mechanical switch means is closed.

3. The device according to claim 2, wherein said semiconductor switch means includes thyristor switch.

4. The device according to claim 2, wherein said semiconductor switch means includes gate turn-off thyristor switch that is subjected to chopping control such that a resultant impedance of said first, second and third superconducting coil is varied.

5. The device according to claim 1,
- wherein said current limiter includes a coil winding frame; and
- wherein said first superconducting coil is wound leftwardly as the outmost layer, said second superconducting coil is wound leftwardly as an intermediate layer, and said third superconducting coil is wound rightwardly as an innermost layer.

6. The device according to claim 1,
- wherein said current limiter includes a coil winding frame; and
- wherein said first superconducting coil is wound rightwardly as the outmost layer, said second superconducting coil is wound rightwardly as an intermediate layer, and said third superconducting coil is wound rightwardly as an innermost layer.

* * * * *